United States Patent
Zhao et al.

(10) Patent No.: US 8,270,519 B2
(45) Date of Patent: Sep. 18, 2012

(54) METHOD AND SYSTEM FOR SELECTING A PRE-CODING MATRIX

(75) Inventors: Nan Zhao, Shenzhen (CN); Zhenxing Gao, Shenzhen (CN); Changguo Jiang, Shenzhen (CN); Huabin Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 413 days.

(21) Appl. No.: 12/631,959

(22) Filed: Dec. 7, 2009

(65) Prior Publication Data
US 2010/0142640 A1    Jun. 10, 2010

(30) Foreign Application Priority Data
Dec. 8, 2008 (CN) .......................... 2008 1 0218278

(51) Int. Cl.
*H04B 7/02* (2006.01)
(52) U.S. Cl. ........................................... 375/267
(58) Field of Classification Search .......... 375/267, 375/340
See application file for complete search history.

(56) References Cited

U.S. PATENT DOCUMENTS

| | | | |
|---|---|---|---|
| 2007/0189151 A1* | 8/2007 | Pan et al. .................. | 370/210 |
| 2007/0280386 A1* | 12/2007 | Waes et al. .................. | 375/347 |
| 2009/0128410 A1* | 5/2009 | Li .................. | 342/367 |
| 2009/0171658 A1* | 7/2009 | Margalit et al. .................. | 704/229 |
| 2009/0202014 A1* | 8/2009 | Mujtaba et al. .................. | 375/267 |
| 2011/0110403 A1* | 5/2011 | Jongren .................. | 375/219 |

OTHER PUBLICATIONS

TSG-RAN WG1 #35 (R1-031303); Lisbon, Portugal, Nov. 17-21, 2003; Source: Ericsson; Title: System-level evaluation of OFDM—further considerations; Agenda Item: 10.1; Document for: Discussion (6 pgs.).

First Chinese Office Action (Translated) related dated (mailed) May 4, 2012; issued in related Chinese Application No. 200810218278.0; Chinese version attached; Huawei Tech Co., Ltd (15 pgs).

* cited by examiner

*Primary Examiner* — Don N Vo
(74) *Attorney, Agent, or Firm* — Finnegan, Henderson, Farabow, Garrett & Dunner LLP

(57) ABSTRACT

A method for selecting a pre-coding matrix, and a device and a telecommunication system for implementing the method are provided. The method includes calculating an effective signal noise ratio (SNR) at each layer for each pre-coding matrix, comparing the lowest SNR at each layer for each pre-coding matrix against the threshold SNR, selecting a proper pre-coding matrix, and considering high and low SNRs of a system during selection of a pre-coding matrix to achieve good pre-coding effects and improve the system performance.

16 Claims, 3 Drawing Sheets

METHOD AND SYSTEM FOR SELECTING A PRE-CODING MATRIX

CROSS-REFERENCE TO RELATED APPLICATION

This application claims priority to Chinese Patent Application No. 200810218278.0, filed on Dec. 8, 2008, which is hereby incorporated by reference in its entirety.

FIELD OF TECHNOLOGY

The present disclosure is related to the telecommunication field, and in particular, to a method and system for selecting a pre-coding matrix.

BACKGROUND

Multiple Input Multiple Output (MIMO) is a telecommunication technology that uses multiple antennas or an antenna array at the transmitter and receiver for signal transmission. The communication channel capacity increases linearly with the number of antennas. The MIMO technology may increase the frequency utilization of the system and expand the system capacity. To improve the system performance, the MIMO system may use the channel information to pre-code signals that are to be sent. To reduce the feedback information, a codebook that is known to the transmitter and receiver can be pre-designed. The codebook includes a series of pre-coding matrixes. The receiver may select a pre-coding matrix from the codebook based on certain rules, and feed back the index of the pre-coding matrix to the transmitter. The transmitter uses the pre-coding matrix to pre-code the information that is to be sent. The process of selecting a pre-coding matrix from a codebook is often referred to as Precoding Matrix Indicator (PMI) selection. During PMI selection, the Signal to Noise Ratio (SNR) at each layer in a system need be calculated, and a pre-coding matrix that results in a high SNR in the system need be selected. The layer here refers to the efficiency (that is, multiplexing rate) of data transmission on the space at a same time point over a same frequency band. If the number of layers in the system is n, it means that the system can transmit n data streams at a same time point over a same frequency band.

According to the conventional MIMO pre-coding technologies, two methods for selecting a PMI are available.

Method 1: For each pre-coding matrix, the SNR at each layer in the system is calculated and the minimum SNR among the SNRs of all layers in the system is recorded. The minimum SNRs of all the pre-coding matrixes are compared. The pre-coding matrix with the highest minimum SNR is selected.

Method 2: For each pre-coding matrix, the average SNR at each layer in the system is calculated. The pre-coding matrix with the highest average SNR is selected.

Shortcomings of the existing technologies: When the pre-coded modulation and coding mode is fixed, the pre-coding technology realized by using the preceding matrix selection methods cannot meet the requirement of a system for different SNRs. The pre-coding matrix selected by using method 1 ensures that the minimum SNR at each layer of the system is the highest, but cannot ensure that the average SNR of the system is high, especially in a system with low SNRs. The pre-coding matrix selected by using method 2 ensures the highest average SNR in the system, but cannot prevent the impact of the lowest SNR at all the layers of the system. When the SNRs in the system are high, the matrix selected by using method 2 may reduce the SNR at the layer with the lowest SNR in the system, thus lowering the system performance.

SUMMARY

Some embodiments of the present disclosure are to provide a method for selecting a pre-coding matrix, a device, and a telecommunication system to help select a proper pre-coding matrix when the pre-coded modulation and coding mode in an MIMO system is fixed.

A method for selecting a pre-coding matrix is provided according to an embodiment of the present disclosure to select a pre-coding matrix for an MIMO telecommunication system. The method includes:
 calculating the effective SNR at each layer for each pre-coding matrix;
 obtaining the minimum effective SNR from the effective SNRs at all layers for the pre-coding matrix; and
 obtaining the minimum effective SNRs of multiple pre-coding matrixes, comparing the effective SNRs with the threshold SNR, and selecting a pre-coding matrix.

A device for selecting a pre-coding matrix is provided in an embodiment of the present disclosure to select a pre-coding matrix for an MIMO telecommunication system. The device includes:
 a calculating module, configured to calculate the effective SNR at each layer for each pre-coding matrix;
 a comparing module, configured to obtain the minimum effective SNR from the effective SNRs at all layers for the pre-coding matrix; and
 a selecting module, configured to: obtain the minimum effective SNRs of multiple pre-coding matrixes, compare the effective SNRs with the threshold SNR, and select a pre-coding matrix.

A transmitter of an MIMO telecommunication system is provided in an embodiment of the present disclosure. The transmitter includes a pre-coding matrix selecting device.

The pre-coding matrix selecting device further includes:
 a calculating module, configured to calculate the effective SNR at each layer for each pre-coding matrix;
 a comparing module, configured to obtain the minimum effective SNR from the effective SNRs at all layers for the pre-coding matrix; and
 a selecting module, configured to: obtain the minimum effective SNRs of multiple pre-coding matrixes, compare the effective SNRs with the threshold SNR, and select a pre-coding matrix.

A receiver of an MIMO telecommunication system is provided in an embodiment of the present disclosure. The receiver includes a pre-coding matrix selecting device.

The pre-coding matrix selecting device further includes:
 a calculating module, configured to calculate the effective SNR at each layer for each pre-coding matrix;
 a comparing module, configured to obtain the minimum effective SNR from the effective SNRs at all layers for the pre-coding matrix; and
 a selecting module, configured to: obtain the minimum effective SNRs of multiple pre-coding matrixes, compare the effective SNRs with the threshold SNR, and select a pre-coding matrix.

An MIMO telecommunication system is provided in an embodiment of the present disclosure. The MIMO system includes:
 a transmitter, configured to: calculate the effective SNR at each layer for each pre-coding matrix; obtain the minimum effective SNR from the effective SNRs at all layers for the pre-coding matrix; obtain the minimum effective SNRs of multiple pre-coding matrixes, compare the effective SNRs with the threshold SNR, and select a pre-coding matrix; send the index of the pre-coding matrix in the codebook to a receiver; pre-code the signals to be sent by using the selected pre-coding matrix; and send the signals to the receiver; and a receiver, configured to receive the signals sent by the transmitter.

An MIMO telecommunication system is provided in another embodiment of the present disclosure. The MIMO system includes:

a transmitter, configured to: find out a pre-coding matrix related to an index of the pre-coding matrix received from a receiver in the codebook; use the related pre-coding matrix to pre-code the signals to be sent; and send the signals to the receiver; and a receiver, configured to: calculate the effective SNR at each layer for each pre-coding matrix; obtain the minimum effective SNR from the effective SNRs at all layers for the pre-coding matrix; obtain the minimum effective SNRs of multiple pre-coding matrixes, compare the effective SNRs with the threshold SNR, and select a pre-coding matrix; send the index of the pre-coding matrix in the codebook to the transmitter; pre-code the signals to be sent by using the selected pre-coding matrix; and send the signals to the transmitter.

According to the preceding description of the technical solution, some embodiments of the present disclosure may have the following advantages: when a pre-coded modulation and coding mode in an MIMO system is fixed, the minimum effective SNR at each layer is calculated for each pre-coding matrix, the minimum effective SNR is compared with the threshold, and thus a proper pre-coding matrix is selected. Whether the SNR is high or low, the MIMO system can use the selected matrix for pre-coding to achieve good effects and improve the performance of the MIMO system.

BRIEF DESCRIPTION OF THE DRAWINGS

To better illustrate the present disclosure or technical solution by using the existing technologies, the drawings that need to be used in the present disclosure or the description of existing technologies are presented in embodiments of the present disclosure. It is understandable that the drawings merely provide several applications of the present disclosure. Those skilled in the art can obtain other drawings based on these drawings without innovative work.

DETAILED DESCRIPTION

The technical solution in the embodiments of the present disclosure is described with the drawings in the present disclosure. Although the disclosure is described through some exemplary embodiments, the disclosure is not limited to such embodiments. It is apparent that those skilled in the art can obtain other embodiments without innovative work based on the embodiments of the present disclosure. The present disclosure is intended to cover these embodiments provided that they fall in the scope of protection defined in the present disclosure.

An MIMO telecommunication system may transmit multiple data streams at a same time point over a same frequency band. That is, an MIMO system may be divided into different layers. The number of layers equals to the number of data streams that can be transmitted at a same time point over a same frequency band. Each layer in the system corresponds to an SNR. That is, each data stream transmitted at a same time point over a same frequency band may have an SNR. To clearly illustrate the technical solution in the present disclosure, the Orthogonal Frequency Division Multiplex (OFDM) system of the MIMO in the LTE system is taken as an example for description.

The embodiments are intended to describe but not confine the present disclosure.

Figure 1:
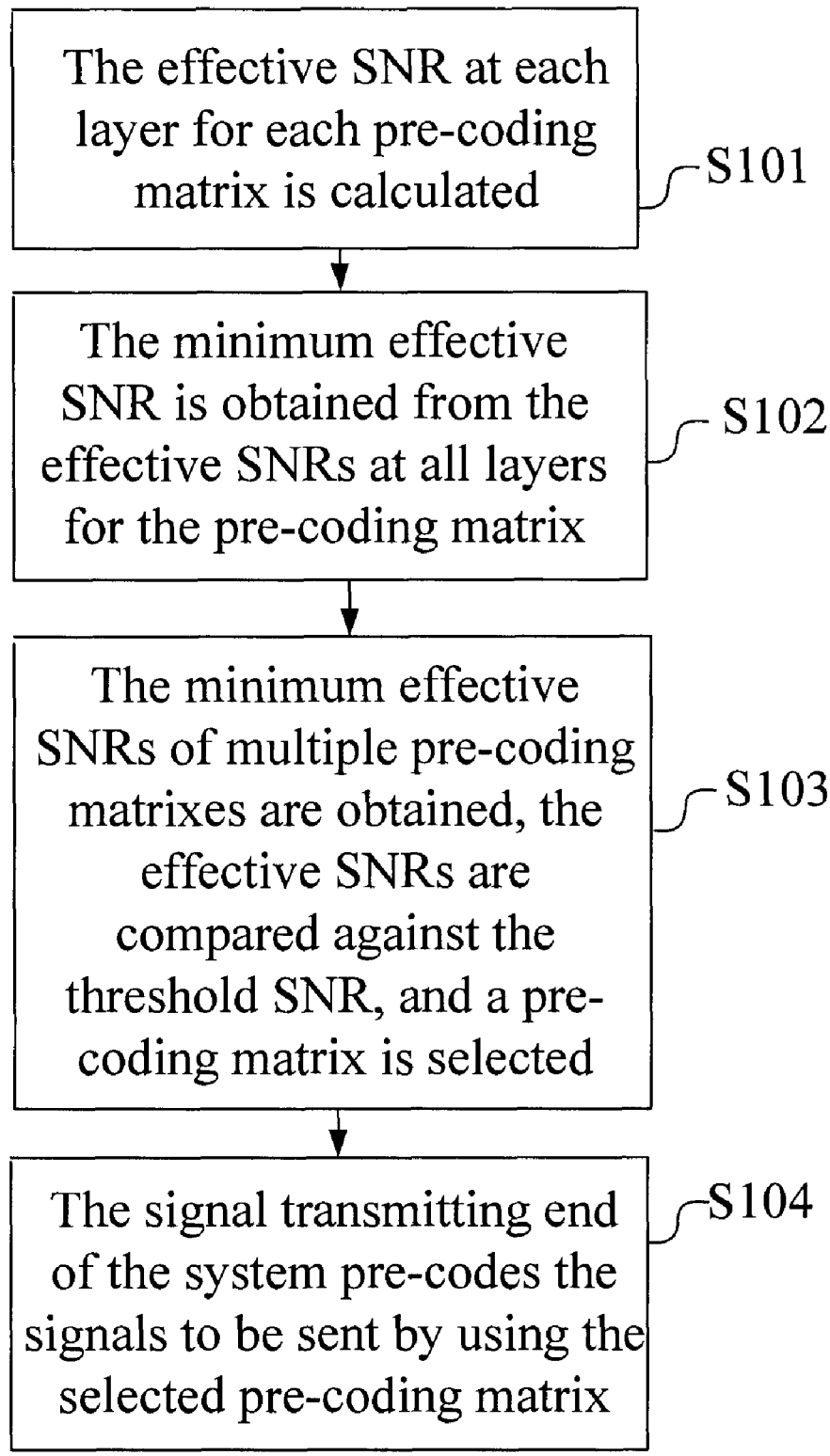
FIG. 1 shows a method for selecting a pre-coding matrix in an MIMO system according to a first embodiment of the present disclosure.

FIG. 1 shows a method for selecting a pre-coding matrix in an MIMO system according to a first embodiment of the present disclosure. The method includes:

Step S101: A plurality of effective SNRs for a pre-coding matrix is calculated. Each effective SNR is corresponding to a layer of the system.

The process of calculating the effective SNR at each layer for a pre-coding matrix may include: calculating the SNR at each layer for the pre-coding matrix and for each sub-carrier of the pre-coding matrix selection collection; calculating the effective SNR at each layer for the pre-coding matrix through the Exponential Effective SNR Mapping (EESM) method based on the SNR at each layer for the pre-coding matrix and for each sub-carrier of the pre-coding matrix selection collection.

The process of calculating the SNR at each layer for the pre-coding matrix and for each sub-carrier of the pre-coding matrix selection collection may include: calculating the SNR at each layer for the pre-coding matrix and for each sub-carrier of the pre-coding matrix selection collection, based on frequency domain channel response value of each sub-carrier in the pre-coding matrix selection collection, each pre-coding matrix in the codebook, and Additive White Gaussian Noise (AWGN) power of the system. The pre-coding matrix selection collection may be defined by the standard protocol or use the code blocks sent by the transmitter of the system as the basis for calculation.

Take a system with m inputs and m outputs as an example. At a same time point on a same frequency band, there are m data streams. In this case, the formula for calculating the $SNR_{i,j,k}^{MMSE}$ is as follows:

$$SNR_{i,j,k}^{MMSE} = \frac{1}{\sigma^2 (W_j^H H_k^H H_k W_j + \sigma^2 I_{m \times m})_{ii}^{-1}} - 1$$

Here, $SNR_{i,j,k}^{MMSE}$ indicates the SNR at layer i for pre-coding matrix j and sub-carrier k of the pre-coding matrix selection collection; $\sigma^2$ indicates the AWGN power; $H_k$ indicates the frequency domain channel response value of sub-carrier k of the pre-coding matrix selection collection; $H_k^H$ is the conjugate transpose of $H_k$; $W_j$ indicates pre-coding matrix j; $W_j^H$ is the conjugate transpose of $W_j$; $I_{m \times m}$ indicates the m-by-m unit matrix; $(W^H H^H HW + \sigma^2 I_{m \times m})^{-1}$ is the reverse matrix of $(W^H H^H HW + \sigma^2 I_{m \times m})$; $(W^H H^H HW + \sigma^2 I_{m \times m})_{ii}^{-1}$ indicates the element in row i column i of the $(W^H H^H HW + \sigma^2 I_{m \times m})^{-1}$ matrix.

The mathematical deduction process for $SNR_{i,j,k}^{MMSE}$ is described as follows:

In the MIMO system with m inputs and m outputs, the following demodulation model is constructed for the linear receiver:

$$\hat{x} = G \cdot y = G \cdot H \cdot W \cdot x + G \cdot n$$

In this model, $\hat{x} = (\hat{x}_1, \hat{x}_2 \ldots \hat{x}_m)^T$ indicates the estimated transmitted signals; $\hat{x}_i$ indicates the estimated signals transmitted by transmitting antenna i; for a Minimum Mean Squared Error (MMSE) receiver, G is $(W^H H^H HW + \sigma^2 I_{m \times m})^{-1} W^H H^H$; $y = (y_1, y_2 \ldots y_m)^T$ indicates the received signals, and $y_i$ indicates the signals received by receiving antenna i; $n = (n_1, n_2 \ldots n_m)^T$ indicates the AWGN, and $n_i$ indicates the Gaussian noise on receiving antenna i;

$$H = \begin{bmatrix} h_{11} & \cdots & \cdots & h_{1m} \\ \vdots & \ddots & & \vdots \\ \vdots & & \ddots & \vdots \\ h_{m1} & \cdots & \cdots & h_{mm} \end{bmatrix}$$

indicates the frequency domain channel response value, and $h_{ij}$ indicates the frequency domain channel response value between receiving antenna j and transmitting antenna i;

$$W = \begin{bmatrix} w_{11} & \cdots & \cdots & w_{1m} \\ \vdots & \ddots & & \vdots \\ \vdots & & \ddots & \vdots \\ w_{m1} & \cdots & \cdots & w_{mm} \end{bmatrix}$$

indicates the pre-coding matrix.

It can be drawn that $SNR_i^{MMSE}$ for frequency domain channel response value H and pre-coding matrix W after demodulation by the MMSE demodulation system is as follows:

$$SNR_i^{MMSE} = \frac{1}{\sigma^2 (W^H H^H HW + \sigma^2 I_2)_{ii}^{-1}} - 1$$

The process of calculating the effective SNR at each layer for a pre-coding matrix through the EESM method based on the SNR at each layer for the pre-coding matrix and each sub-carrier of the pre-coding matrix selection collection may include: obtaining the SNR at each layer for the pre-coding matrix and for each sub-carrier of the pre-coding matrix selection collection and calculating the effective SNR at each layer for the pre-coding matrix through the EESM method.

The formula for calculating the effective SNR through the EESM method is as follows:

$$SNR_{i,j}^{EESM} = -\beta \cdot \ln\left(\frac{1}{N} \sum_{k=1}^{N} e^{\frac{SNR_{i,j,k}^{MMSE}}{\beta}}\right)$$

In this formula, $SNR_{i,j}^{EESM}$ indicates the effective SNR at layer i for pre-coding matrix j; $\beta$ indicates the optimization factor that is related to the modulation and coding mode and length of the pre-coding matrix selection collection (if the modulation and coding mode and length of the pre-coding matrix selection collection are fixed, $\beta$ is fixed); N indicates the number of sub-carriers in the pre-coding matrix selection collection; $SNR_{i,j,k}^{MMSE}$ indicates the SNR at layer i for pre-coding matrix j and sub-carrier k of the pre-coding matrix selection collection.

Step S102: The minimum effective SNR among the plurality of effective SNRs at all layers for the pre-coding matrix is obtained.

After the effective SNR at each layer for the pre-coding matrix is calculated, the minimum effective SNR is selected from the effective SNRs at all the layers. If the number of layers is m, the minimum effective SNR for pre-coding matrix j is calculated as follows: $ESNR_j^{Min} = \min(SNR_{1,j}^{EESM}, \ldots, SNR_{i,j}^{EESM}, \ldots, SNR_{m,j}^{EESM})$, in which, $SNR_{i,j}^{EESM}$ indicates the effective SNR at layer i for pre-coding matrix j.

Step S103: A plurality of minimum effective SNRs of multiple pre-coding matrixes is obtained, each minimum effective SNR corresponding to a pre-coding matrixes, and the minimum effective SNRs are compared against the threshold SNR, and a pre-coding matrix is selected.

This process may include: obtaining the minimum effective SNRs of multiple pre-coding matrixes, comparing these minimum effective SNRs against the threshold SNR, and selecting a pre-coding matrix. If all these minimum effective SNRs are lower than the threshold SNR, the pre-coding matrix with the lowest minimum effective SNR among these SNRs is selected; if at least one minimum effective SNR among these SNRs is higher than the threshold SNR, the pre-coding matrix with the highest minimum effective SNR among these SNRs is selected.

The threshold SNR is related to the modulation and coding mode and length of the pre-coding matrix selection collection. If the modulation and coding mode and length of the pre-coding matrix selection collection are fixed, the threshold SNR is fixed. In one embodiment, the threshold SNR may be the SNR when the system noise is AWGN and the Block Error Rate (BLER) reaches 10%.

When all the minimum effective SNRs are lower than the threshold SNR, it can be regarded that the SNR in the system is low. In this case, the pre-coding matrix with the lowest minimum effective SNR may result in the highest average SNR in the system. As a result, the average possibility of correct decoding at all layers in the system increases, thus improving the system performance. When more than one minimum effective SNR is higher than the threshold SNR, it can be regarded that the SNR in the system is high. The higher the SNR at a layer is, the less likely the codes at this layer are incorrectly decoded. In this case, the pre-coding matrix with the highest minimum effective SNR is selected to increase the possibility of correct decoding of codes at the layers with low SNRs, thus improving the system performance.

Further, the method according to one embodiment of the present disclosure may include step S104 where the signal transmitter of the system uses the selected pre-coding matrix to pre-code the signals that are to be sent.

The transmitter and receiver in the telecommunication system know a fixed codebook. The codebook saves all the pre-coding matrixes described in the preceding embodiments.

If the system is a frequency division duplex system, only the receiver may select the pre-coding matrix. If the system is a time division duplex system, either the transmitter or receiver may select the pre-coding matrix.

If the pre-coding matrix is selected by the transmitter, the transmitter pre-codes the information to be sent by using the selected the pre-coding matrix and sends the index of the pre-coding matrix in the codebook to the receiver. If the pre-coding matrix is selected by the receiver, the receiver selects the pre-coding matrix, and sends the index of the pre-coding matrix in the codebook to the transmitter. The transmitter finds out the pre-coding matrix in the codebook according to the index, and then uses the matrix to pre-code the information to be sent.

In one embodiment, the effective SNR at each layer for each pre-coding matrix is calculated through the EESM method, and the minimum SNRs for all the pre-coding matrixes are compared against a threshold SNR. When all the minimum effective SNRs are lower than the threshold SNR, it indicates that the SNR in the system is low. In this case, the pre-coding matrix with the lowest minimum effective SNR can result in the highest average SNR in the system. When more than one minimum effective SNR is higher than the threshold SNR, it indicates that the SNR in the system is high. In this case, the pre-coding matrix with the highest minimum effective SNR is selected to increase the possibility of correct decoding of codes at the layers with low SNRs. The method takes two scenarios into consideration: when the SNR is high in the system and when the SNR is low in the system. The pre-coding matrix selected by using this method can ensure good coding quality, thus improving the system performance.

It is understandable to those skilled in the art that all or part of the steps in the foregoing embodiments may be performed through hardware instructed by a program. The program may be stored in a computer-readable storage medium such as ROM/RAM, magnetic disk, and compact disk. When being executed, the program performs the steps described in the preceding embodiment.

Figure 2:
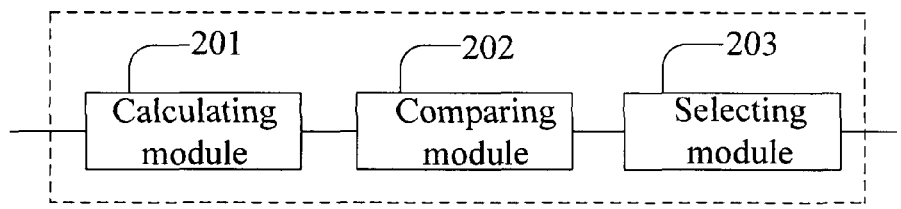
FIG. 2 shows a device for selecting a pre-coding matrix according to a second embodiment of the present disclosure.

FIG. 2 shows a device for selecting a pre-coding matrix according to a second embodiment of the present disclosure. The device is configured to select a pre-coding matrix for an MIMO system. The device can be located at the transmitter or receiver of the system. The device includes:

a calculating module 201, configured to calculate the effective SNR at each layer for each pre-coding matrix;

a comparing module 202, configured to obtain the minimum effective SNR from the effective SNRs at all layers for the pre-coding matrix; and a selecting module 203, configured to: receive the minimum effective SNRs of multiple pre-coding matrixes, compare the effective SNRs with the SNR threshold, and select a pre-coding matrix.

The embodiment of the present disclosure provides a device for selecting a pre-coding matrix to select a proper pre-coding matrix for the MMO system and use the selected matrix to improve system performance.

Figure 3:
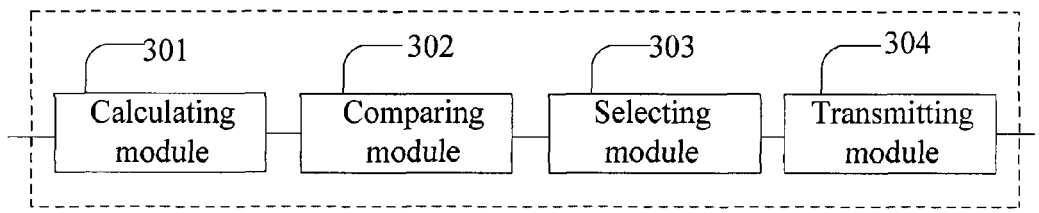
FIG. 3 shows another device for selecting a pre-coding matrix according to a third embodiment of the present disclosure.

FIG. 3 shows another device for selecting a pre-coding matrix according to a third embodiment of the present disclosure. The device includes a calculating module 301, a comparing module, a selecting module 303, and a sending module 304. The sending module is configured to send the index of the selected pre-coding matrix in the codebook. The function of other modules according to the third embodiment is similar to that of the second embodiment.

The device in this embodiment selects a proper pre-coding matrix, and sends the index of the pre-coding matrix in the codebook to the transmitter or receiver. The transmitter or receiver then uses the pre-coding matrix selected by the device for coding or decoding.

It is understandable to those skilled in the art that same functions can be implemented if one or multiple modules in the preceding embodiment are integrated. The present disclosure is intended to cover these improvements and changed forms.

Figure 4:
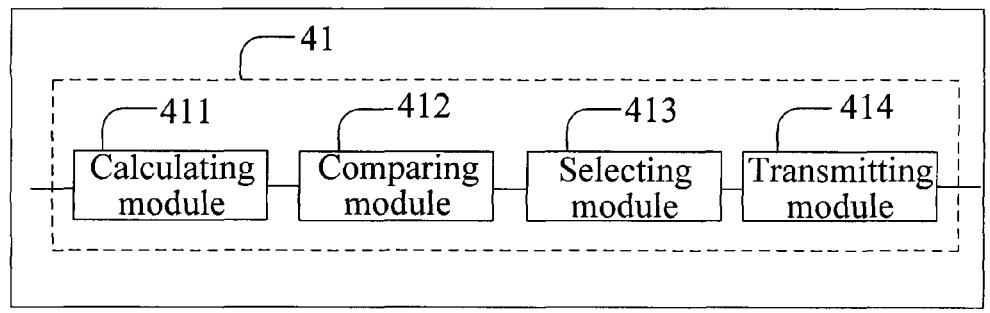
FIG. 4 shows a transmitter of an MIMO telecommunication system according to a fourth embodiment of the present disclosure.

It is understandable that the transmitter of the MIMO telecommunication system includes the device for selecting a pre-coding matrix in the second or third embodiment of the present disclosure. FIG. 4 shows a transmitter of an MIMO telecommunication system in a fourth embodiment of the present disclosure. The transmitter includes a pre-coding matrix selecting device 41.

The pre-coding matrix selecting device 41 further includes:

a calculating module 411, configured to calculate the effective SNR at each layer for each pre-coding matrix;

a comparing module 412, configured to obtain the minimum effective SNR from the effective SNRs at all layers for the pre-coding matrix;

a selecting module 413, configured to: obtain the minimum effective SNRs of multiple pre-coding matrixes, compare the effective SNRs with the SNR threshold, and select a pre-coding matrix; and a sending module 414, configured to send the index of the selected pre-coding matrix in the codebook to the receiver.

The transmitter in the fourth embodiment of the present disclosure may use the proper pre-coding matrix selected by the pre-coding matrix selecting device to pre-code signals.

Figure 5:
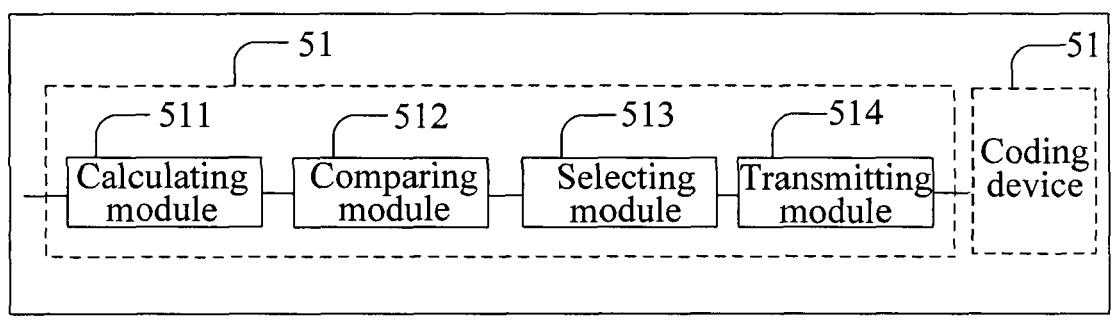
FIG. 5 shows another transmitter of an MIMO telecommunication system according to a fifth embodiment of the present disclosure.

FIG. 5 shows a transmitter of an MIMO telecommunication system in a fifth embodiment of the present disclosure. The transmitter is based on the transmitter in the fourth embodiment, and includes a pre-coding matrix selecting device 51, and a coding device 52. The coding device is configured to code the signals by using the selected pre-coding matrix.

The transmitter in the fifth embodiment of the present disclosure may use the proper pre-coding matrix selected by the pre-coding matrix selecting device to pre-code signals.

It is understandable that the receiver of the MIMO telecommunication system includes the device for selecting a pre-coding matrix in the second or third embodiment of the present disclosure. A receiver of an MIMO telecommunication system is provided in a sixth embodiment of the present disclosure. The receiver includes a pre-coding matrix selecting device 61.

The pre-coding matrix selecting device 61 further includes:

a calculating module 611, configured to calculate the effective SNR at each layer for each pre-coding matrix;

a comparing module 612, configured to obtain the minimum effective SNR from the effective SNRs at all layers for the pre-coding matrix;

a selecting module 613, configured to: obtain the minimum effective SNRs of multiple pre-coding matrixes, compare the effective SNRs with the SNR threshold, and select a pre-coding matrix; and a sending module 614, configured to send the index of the selected pre-coding matrix in the codebook to the transmitter to instruct the transmitter to code the signals by using the selected pre-coding matrix.

The transmitter in the sixth embodiment of the present disclosure may use the proper pre-coding matrix selected by the pre-coding matrix selecting device to pre-code signals.

Figure 6:
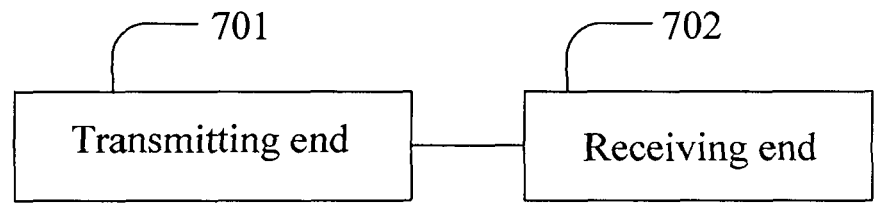
FIG. 6 shows an MIMO telecommunication system according to a seventh embodiment of the present disclosure.

FIG. 6 shows an MIMO telecommunication system in a seventh embodiment of the present disclosure. The MIMO system includes a transmitter 701 and a receiver 702.

The transmitter 701 is configured to calculate the effective SNR at each layer for each pre-coding matrix, obtain the minimum effective SNR from the effective SNRs at all layers for the pre-coding matrix, obtain the minimum effective SNRs of multiple pre-coding matrixes, compare the effective SNRs with the SNR threshold, and select a pre-coding matrix; send the index of the pre-coding matrix in the codebook to a receiver, pre-code the signals to be sent by using the selected pre-coding matrix, and send the signals to the receiver 702.

The receiver 702 is configured to receive the signals sent by the transmitter 701.

The system according to an embodiment of the present disclosure is configured to calculate the minimum effective SNR among the effective SNRs at each layer for each pre-coding matrix to select a proper pre-coding matrix for the MIMO system, and use the matrix for pre-coding to improve the system performance.

It is understandable that the pre-coding matrix can be selected by a receiver. An MIMO telecommunication system is provided in an eighth embodiment of the present disclosure. The system includes a transmitter 801 and a receiver 802.

The transmitter 801 is configured to search for a pre-coding matrix related to an index of the pre-coding matrix received from the receiver 802 in the codebook, use the related pre-coding matrix to pre-code the signals to be sent, and send the signals to the receiver 802.

The receiver 802 is configured to calculate the effective SNR at each layer for each pre-coding matrix, obtain the minimum effective SNR from the effective SNRs at all layers for the pre-coding matrix, obtain the minimum effective SNRs of multiple pre-coding matrixes, compare the effective SNRs with the SNR threshold, and select a pre-coding matrix, send the index of the pre-coding matrix in the codebook to the transmitter 801, pre-code the signals to be sent by using the selected pre-coding matrix, and send the signals to the transmitter 801.

The PMI in an embodiment of the present disclosure is selected by the signal receiver. Through the selection result, the transmitter may use the proper pre-coding matrix to pre-code the signals.

When the modulation and coding mode of an MIMO system is fixed, the method for selecting a pre-coding matrix provided in an embodiment of the present disclosure may calculate an effective SNR at each layer for each pre-coding matrix, compare the lowest SNR at each layer for each pre-coding matrix and layer with the SNR threshold, select a proper pre-coding matrix, and consider high and low SNRs of a system during selection of a pre-coding matrix to achieve good pre-coding effects and improve the system performance.

Some embodiments are provided in the present disclosure. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What we claimed is:

1. A method for selecting a pre-coding matrix in a Multiple Input Multiple Output telecommunication system, comprising:
    calculating a plurality of effective signal noise ratios (SNRs) for a pre-coding matrix, each effective SNR corresponding to a layer of the system;
    obtaining a minimum effective SNR from the plurality of effective SNRs at all layers for the pre-coding matrix; and
    obtaining a plurality of minimum effective SNRs of multiple pre-coding matrixes, comparing the minimum effective SNRs with a threshold SNR, and selecting a pre-coding matrix;
    wherein comparing the minimum effective SNRs with the threshold SNR and selecting the pre-coding matrix comprises:
    selecting the pre-coding matrix with the lowest minimum effective SNR among the minimum effective SNRs, if all minimum effective SNRs are lower than the threshold SNR; or
    selecting the pre-coding matrix with the highest minimum effective SNR among the minimum effective SNRs, if at least one minimum effective SNR among the minimum effective SNRs is higher than the threshold SNR.

2. The method according to claim 1, wherein the threshold SNR is a SNR when a system noise is Additive White Gaussian Noise (AWGN) and a Block Error Rate (BLER) reaches 10% in the system.

3. The method according to claim 1, wherein the process of calculating the effective SNR at each layer for a pre-coding matrix comprises:
    calculating an SNR at each layer for the pre-coding matrix and for each sub-carrier of a pre-coding matrix selection collection; and
    calculating the effective SNR at each layer for the pre-coding matrix through the Exponential Effective SNR Mapping (EESM) method based on the SNR at each layer for the pre-coding matrix and for each sub-carrier of the pre-coding matrix selection collection.

4. The method according to claim 3, wherein the process of calculating the SNR at each layer for the pre-coding matrix and for each sub-carrier of the pre-coding matrix selection collection comprises:
    calculating the SNR at each layer for the pre-coding matrix and for each sub-carrier of the pre-coding matrix selection collection, based on frequency domain channel response value of each sub-carrier in the pre-coding matrix selection collection, each pre-coding matrix in a codebook, and Additive White Gaussian Noise (AWGN) power of the system.

5. The method according to claim 1, wherein the multiple pre-coding matrixes are saved in a codebook.

6. The method according to claim 5, further comprising:
    sending an index of the multiple pre-coding matrix saved in the codebook to a counterparty of the system.

7. The method according to claim 6, further comprising:
    pre-coding by a transmitter, a signal based on the saved multiple pre-coding matrix.

8. A device for selecting a pre-coding matrix, comprising:
    a calculating module, configured to calculate an effective signal noise ratio (SNR) at each layer for each pre-coding matrix;
    a comparing module, configured to obtain a minimum effective SNR from the effective SNRs at all layers for the pre-coding matrix; and
    a selecting module, configured to: receive minimum effective SNRs of multiple pre-coding matrixes, compare the minimum effective SNRs with a SNR threshold, and select a pre-coding matrix with the lowest minimum effective SNR among the minimum effective SNRs, if all minimum effective SNRs are lower than the threshold SNR; or select a pre-coding matrix with the highest minimum effective SNR among the minimum SNRs, if at least one minimum effective SNR among the minimum effective SNRs is higher than the threshold SNR.

9. The device according to claim 8, further comprising:
a sending module, configured to send to a receiver an index of a saved pre-coding matrix in a codebook.

10. A transmitter of a Multiple Input Multiple Output (MIMO) telecommunication system, coupling with a receiver of the MIMO telecommunication system, wherein,
the transmitter is configured to calculate an effective signal noise ratio (SNR) at each layer for each pre-coding matrix; obtain a minimum effective SNR from the effective SNRs at all layers for the pre-coding matrix; obtain the minimum effective SNRs of multiple pre-coding matrixes, compare the minimum effective SNRs with a SNR threshold, and select a pre-coding matrix with the lowest minimum effective SNR among the minimum effective SNRs, if all minimum effective SNRs are lower than the threshold SNR; or select a pre-coding matrix with the highest minimum effective SNR among the minimum SNRs, if at least one minimum effective SNR among the minimum effective SNRs is higher than the threshold SNR; send an index of the pre-coding matrix saved in a codebook to a receiver; pre-code signals to be sent by using the saved pre-coding matrix, and send the signals to the receiver.

11. The transmitter according to claim 10, comprising a pre-coding matrix selecting device, wherein the pre-coding matrix selecting device comprises:
a calculating module, configured to calculate an effective signal noise ratio (SNR) at each layer for each pre-coding matrix;
a comparing module, configured to obtain a minimum effective SNR from the effective SNRs at all layers for the pre-coding matrix; and
a selecting module, configured to obtain the minimum effective SNRs of multiple pre-coding matrixes, compare the minimum effective SNRs with the SNR threshold, and select a pre-coding matrix with the lowest minimum effective SNR among the minimum effective SNRs, if all minimum effective SNRs are lower than the threshold SNR; or select a pre-coding matrix with the highest minimum effective SNR among the minimum SNRs, if at least one minimum effective SNR among the minimum effective SNRs is higher than the threshold SNR.

12. The transmitter according to claim 11, wherein the pre-coding matrix selecting device further comprises:
a sending module, configured to send to the receiver the index of the pre-coding matrix saved in the codebook.

13. The transmitter according to claim 11, wherein the pre-coding matrix selecting device further comprises:
a coding device, configured to code a signal by using the saved pre-coding matrix.

14. A receiver of a Multiple Input Multiple Output (MIMO) telecommunication system, coupling with a transmitter of the MIMO telecommunication system, wherein,
the receiver is configured to calculate an effective signal noise ratio (SNR) at each layer for each pre-coding matrix, obtain a minimum effective SNR from the effective SNRs at all layers for the pre-coding matrix, obtain minimum effective SNRs of multiple pre-coding matrixes, compare the minimum effective SNRs with a SNR threshold, and select a pre-coding matrix with the lowest minimum effective SNR among the minimum effective SNRs, if all minimum effective SNRs are lower than the threshold SNR; or select a pre-coding matrix with the highest minimum effective SNR among the minimum SNRs, if at least one minimum effective SNR among the minimum effective SNRs is higher than the threshold SNR, send an index of the pre-coding matrix saved in a codebook to the transmitter, pre-code signals to be sent by using the saved pre-coding matrix, and send the signals to the transmitter.

15. The receiver according to claim 14, comprising a pre-coding matrix selecting device, wherein the pre-coding matrix selecting device comprises:
a calculating module, configured to calculate an effective signal noise ratio (SNR) at each layer for each pre-coding matrix;
a comparing module, configured to obtain a minimum effective SNR from the effective SNRs at all layers for the pre-coding matrix; and
a selecting module, configured to obtain minimum effective SNRs of multiple pre-coding matrixes, compare the minimum effective SNRs with a SNR threshold, and select a pre-coding matrix with the lowest minimum effective SNR among the minimum effective SNRs, if all minimum effective SNRs are lower than the threshold SNR; or select a pre-coding matrix with the highest minimum effective SNR among the minimum SNRs, if at least one minimum effective SNR among the minimum effective SNRs is higher than the threshold SNR.

16. The receiver according to claim 15, wherein the pre-coding matrix selecting device further comprises:
a sending module, configured to send to the receiver an index of the pre-coding matrix saved in the codebook, and notify the receiver to code a signal based on the saved pre-coding matrix.

* * * * *